US 7,780,572 B2

(12) United States Patent
Gierer et al.

(10) Patent No.: US 7,780,572 B2
(45) Date of Patent: Aug. 24, 2010

(54) CONTROL VALVE ARRANGEMENT FOR CONTROLLING A STARTING CLUTCH OF AN AUTOMATIC TRANSMISSION

(75) Inventors: Georg Gierer, Kressbronn (DE); Thilo Schmidt, Meckenbeuren (DE); Anton Fritzer, Markdorf (DE); Markus Herrmann, Scheidegg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 289 days.

(21) Appl. No.: 12/065,670

(22) PCT Filed: Oct. 13, 2006

(86) PCT No.: PCT/EP2006/009903

§ 371 (c)(1),
(2), (4) Date: Mar. 4, 2008

(87) PCT Pub. No.: WO2007/045400

PCT Pub. Date: Apr. 26, 2007

(65) Prior Publication Data

US 2008/0234100 A1    Sep. 25, 2008

(30) Foreign Application Priority Data

Oct. 21, 2005   (DE) .................. 10 2005 050 489

(51) Int. Cl.
*B60W 10/02* (2006.01)
*F16H 61/26* (2006.01)

(52) U.S. Cl. .................. 477/175; 477/159; 477/906

(58) Field of Classification Search .................. 477/79, 477/80, 88, 143, 145, 146, 148, 152, 159, 477/163, 164, 169, 174, 175, 906
See application file for complete search history.

(56) References Cited

U.S. PATENT DOCUMENTS

| 4,981,052 | A | 1/1991 | Gierer |
| 5,399,130 | A * | 3/1995 | Long .................. 477/130 |
| 5,509,868 | A * | 4/1996 | Eaton .................. 477/130 |
| 5,944,626 | A | 8/1999 | Spiess et al. |
| 6,467,262 | B1 | 10/2002 | Baeuerle |
| 7,163,096 | B2 | 1/2007 | Neuner |
| 2007/0123388 | A1 | 5/2007 | Petrzik et al. |

FOREIGN PATENT DOCUMENTS

DE    196 09 785 A1    9/1997

(Continued)

*Primary Examiner*—David D Le
(74) *Attorney, Agent, or Firm*—Davis & Bujold, P.L.L.C.

(57) ABSTRACT

A control valve arrangement having a clutch regulation valve (3), which pressurizes a device to actuate the clutch, and a valve that produces a controlled pilot pressure (P_VST3). An electronic control unit (ECU) controls a valve to supply a control valve with the pressure (P_VST3). The arrangement further having a hydraulic system which, if the ECU fails and the pressure (P_VST3) ceases, the last shift condition of the clutch actuation device, prior to the ECU failure, can be maintained in an emergency. The arrangement includes a valve, which delivers an activation pressure (P_A), depending on an engine-speed-dependent control pressure (P_D), to an actuation valve (2), which then delivers the pressure (P_A) to the valve (3) to prevent the emergency function initiation despite a lack of pressure (P_VST3) and existence of the pressure (P_D) sufficiently high to initiate the emergency function.

14 Claims, 7 Drawing Sheets

FOREIGN PATENT DOCUMENTS

| | | |
|---|---|---|
| DE | 198 56 297 A1 | 6/2000 |
| DE | 199 43 939 A1 | 3/2001 |
| DE | 102 38 104 A1 | 3/2004 |
| DE | 103 38 355 A1 | 3/2005 |
| DE | 10 2004 018 962 B3 | 10/2005 |
| DE | 10 2004 020 569 A1 | 12/2005 |
| EP | 0 487 128 A1 | 5/1992 |
| EP | 0 498 210 A1 | 8/1992 |
| EP | 0 982 512 A2 | 3/2000 |
| EP | 1 267 102 A2 | 12/2002 |
| EP | 1 522 754 A1 | 4/2005 |
| GB | 2 284 026 A | 5/1995 |

* cited by examiner

CONTROL VALVE ARRANGEMENT FOR CONTROLLING A STARTING CLUTCH OF AN AUTOMATIC TRANSMISSION

This application is a national stage completion of PCT/EP2006/009903 filed Oct. 13, 2006, which claims priority from German Application Serial No. 10 2005 050 489.2 filed Oct. 21, 2005.

FIELD OF THE INVENTION

The invention concerns a control valve arrangement for controlling a starting clutch of an automatic transmission of a motor vehicle.

BACKGROUND OF THE INVENTION

In automatic transmissions with an automated wet starting clutch, in order to activate a mechanical emergency transmission operation function, for example in the event that a transmission control unit has failed, it is usual for the force-flow linkage in the transmission to be eliminated by virtue of the fact that when not energized, the starting clutch is shifted to its disengaged condition. Especially in vehicle conditions typical of flowing traffic, this strategy can lead to critical situations, since the vehicle can only coast forward without any positive propulsion drive.

For technical reasons related to safety, engaging the wet starting clutch in such a driving situation is also not possible, since the force-flow linkage can only be obtained by way of a hydraulic clutch actuation pressure. Inasmuch as when the speed of the vehicle is reduced with the clutch engaged, the vehicle's engine will stall, there still remains some residual vehicle speed, but some important auxiliary aggregates, such as braking force enhancers or steering assistance pumps normally driven by the engine, can no longer be sufficiently powered.

In automatic transmissions with a dry starting clutch, when the mechanical emergency operation function is activated, this clutch is engaged so that the vehicle's drive output remains in driving connection with the engine until the vehicle comes to rest. Although no critical driving situations arise because of this, once the vehicle has stopped, it can no longer be moved or pushed out of the way.

Consequently, there is need for a control device for a starting clutch of an automatic transmission of a motor vehicle which, depending on the engine speed and/or the drive output speed of the transmission, interrupts the force-flow linkage in the drivetrain only when the engine speed or transmission output speed falls below a certain value so that the vehicle's engine does not stall, the auxiliary aggregates remain powered and it is still possible for the driver to drive safely away from any danger area that there may be. In addition, such behavior also allows the vehicle to be moved after coming to rest, since the force flow, between the engine and the transmission, is then interrupted.

Against this background, a hydraulic emergency control system for a belt-type transmission is known from DE 199 43 939 A1 in which a clutch, associated with the transmission, can be disengaged or engaged, depending on the speed of a vehicle drive engine. In this way, in the event of a failure repeated stalling of the drive engine, when the engine speed falls below a certain limit value, can be avoided and starting when the speed rises above a certain value is made possible. Depending on the design of this emergency control system, the engine-speed-dependent control signal can be produced and used as a hydraulic pressure, a pneumatic pressure or an electric voltage.

In addition, a method for controlling an emergency shift program for an automatic transmission with a starting clutch is known from DE 102 38 104 A1, which is especially designed to enable emergency running, even when the vehicle is at rest, and to prevent the engine speed from falling below a stalling threshold. In this method, it is provided that the emergency shift program is actuated by a signal that depends on the vehicle's speed and/or its engine speed. The signal is processed by a valve logic system and has the effect that in thrust operation the force linkage to the engine is interrupted in time to prevent stalling of the vehicle's engine.

Furthermore, a dual-clutch transmission is known from DE 103 38 355 A1, which has a first and a second clutch such that for normal operation to engage/disengage the first clutch, a first hydraulic system and to engage/disengage the second clutch, a second hydraulic system controlled by an electronic system are present. In addition, a status-maintaining hydraulic system is provided to which status signals corresponding to the momentary shift condition of the first and second clutches are passed, via a first and a second hydraulic line, and which is connected by hydraulic control lines to the first and second hydraulic systems. If the electronic system should fail, the status-maintaining hydraulic system controls the first and second hydraulic systems in such a manner that at least in many shift conditions of the two clutches, the shift condition of the clutches that existed immediately before the electronic failure is maintained.

Finally, from DE10 2004 020 569,8 which was not published before the filing date of the present patent application, a control valve arrangement for controlling a starting clutch of an automatic transmission is known with which, in a simple, inexpensively produced and reliable manner, in an emergency control situation the starting clutch can be disengaged if the engine speed and/or the drive output speed of the transmission or the driving speed of the vehicle fall below a predetermined value.

This control valve arrangement comprises a clutch control valve for controlling at least one clutch actuation device which, during normal operation of the transmission, converts a supply pressure delivered to it as a function of a pilot pressure or an electric pilot signal, into a clutch actuation pressure to control the clutch actuation device. The control valve arrangement is also characterized in that to realize emergency transmission operation, if the pilot pressure or the electric pilot signal should fail then, as a function of the engine speed and/or the drive output speed, an activation pressure can be delivered to the clutch control valve or directly to the clutch actuation device, where the clutch is kept in the engaged position so long as the speed remains above a predetermined limiting speed value.

This valve arrangement provides a control device for the emergency driving operation of a vehicle with an automatic transmission that can be produced inexpensively and operated reliably and which is activated, for example when an electronic transmission control unit and/or an electrically actuated clutch control valve fails. The engine-speed-dependent and/or transmission-output-speed-dependent control pressure then ensures that a starting clutch of the automatic transmission remains engaged in order to transmit torque through the transmission so long as the driving speed and thus the speed of the drive engine does not fall below a stalling speed at which the engine's function as a combustion engine would cease.

During such emergency driving operation, if the driving speed falls so much that there is a risk of stalling if the starting clutch remains engaged, then by way of the speed-coupled control pressure, the known control valve arrangement disengages the starting clutch which was until then transmitting torque. This advantageously avoids stalling of the engine so that important auxiliary vehicle aggregates, such as a braking force enhancer and a steering assistance pump, can still be powered by the engine without problems.

Although this known control valve arrangement works very well, it has nevertheless been found that in some operating situations its function is disadvantageous and, therefore, requires improvement. For example, an operating situation of a vehicle can arise in which it has first been moved in a forward or reverse gear with an engine speed above the limiting speed value. In this type of operation, a self-holding valve of the control valve arrangement to be improved will have been actuated by the speed-dependent pressure as described.

Now when starting from this driving operation mode, the vehicle is stopped but the engine speed is still kept above the limiting speed value, the self-holding valve remains in a position such that if the pilot pressure fails, emergency operation with a starting clutch then to be engaged is enabled. However, this system behavior persists when the starting clutch is disengaged by a corresponding selector lever actuation from the forward drive selector lever setting D or from the reverse drive selector lever setting R to the transmission selector lever setting neutral or the parking setting P and in the transmission the most recently used gear remains engaged.

Inasmuch as in such a situation the pilot pressure is absent, the known control valve arrangement engages the starting clutch and the vehicle starts off with a jerk, because of the comparatively high engine speed, although since the selector lever position is at neutral, the vehicle's driver is not prepared for this. For safety reasons, such behavior of the known control valve arrangement should be prevented.

Accordingly, the purpose of the invention is to propose a control valve arrangement of the type in question with which unintentional initiation of an emergency operating function can be avoided.

SUMMARY OF THE INVENTION

According to the claims, the starting point of the invention is a control valve arrangement for controlling the actuation of at least one starting clutch of an automatic transmission of a motor vehicle, in each case having a clutch control valve through which a supply pressure can be passed into a pressure chamber of the respective clutch actuation device, with a pressure regulation valve that produces a controlled pilot pressure, that can be actuated by an electronic control unit and supplies a control valve of the control valve arrangement with the pilot pressure, and with a self-holding hydraulic system with whose help, if the electronic control unit fails and the pilot pressure is therefore absent, the shift condition of the at least one clutch actuation device that existed before the failure of the electronic control unit is maintained in the sense of an emergency operating function, at least in many operating situations.

To solve the technical problem described, in this control valve arrangement according to the invention, it is first provided that the self-holding hydraulic system for realizing the emergency operating function comprises a self-holding valve and an actuation valve. The self-holding valve is designed to be suitable for passing on to the actuation valve an actuation pressure as a function of an engine-speed-dependent control pressure and the actuation valve is capable of passing the actuation pressure to the at least one clutch control valve. Moreover, the control valve arrangement is provided with means whereby, in certain operating situations, activation of the emergency operating function can be prevented despite the absence of the pilot pressure and the presence of an engine-speed-dependent control pressure sufficiently high to produce the emergency operation function.

This control valve arrangement according to the invention, therefore, activates an emergency operation mode of the vehicle in the event that an associated electronic control unit fails, or prevents such activation, in a manner appropriate for the vehicle's operating situation at the time.

A particular operating situation in which, according to the invention, despite a failure of the electronic control unit or absence of the pilot pressure for the valves, and despite a drive engine speed that is above an established limiting value, the at least one starting clutch is not engaged, exists when the motor vehicle is first driven normally forward or in reverse in drive settings D or R with its starting clutch engaged or slipping and the vehicle is then stopped and the starting clutch has been disengaged by moving the transmission selector lever to the neutral or parking position P of the selector lever while a gear is engaged in the automatic transmission. In this way, if a gear is still engaged and the starting clutch is disengaged, the latter is prevented from automatically engaging and taking the driver by surprise.

According to a further preferred development of the invention, the control valve arrangement is designed such that if the particular operating situation exists, then to prevent activation of the emergency operating function, a hydraulic connection for the actuation pressure, between the self-holding valve and the actuation valve, is engaged.

In a concrete structural embodiment, it can be provided that the actuation valve, formed in a so-termed valve casing of an electro-hydraulic transmission control unit, can be acted upon by a neutralizing pressure which, in the absence of the pilot pressure, can be passed from the actuation valve to the self-holding valve in such a manner that the self-holding valve blocks the onward passage of the actuation pressure to the actuation valve.

The neutralizing pressure is provided by an electro-mechanically actuated valve that can be controlled by the electronic control unit. If the electronic control unit has failed, but the aforesaid critical operating situation is not present, activation of the emergency operating function in which the starting clutch is or remains engaged may be desired. Since failure of the electronic control unit also means that the electro-mechanically actuated valve that produces the neutralizing pressure is no longer controlled by it. There is also no neutralizing pressure at the actuation valve. Thus, in the presence of a sufficiently high engine-speed-dependent control pressure, i.e., under the control of the self-holding and the actuation valves, pressure medium can get to the clutch actuation device via the clutch regulation valve and the starting clutch can be engaged.

In an advantageous design, it can be provided that the neutralizing pressure can be passed into a pressure chamber of the self-holding valve delimited by an axially movable control piston by way of which the onward passage of the actuation pressure, between the self-holding valve and the actuation valve, can be interrupted. In this case, the pressure chamber is preferably that in which a restoring spring of the self-holding valve that acts upon this control piston is located.

According to another embodiment of the invention, the control valve arrangement comprises a cut-off valve by way of which the pressure medium at the speed-dependent control pressure can be drained into a pressure medium tank when the neutralizing pressure acts on the cut-off valve.

In a concrete embodiment of this second embodiment of the invention, it is provided that the neutralizing pressure can be passed into the pressure chamber of the cut-off valve that is remote from the restoring spring, where this neutralizing pressure can act upon a servo-piston of the control valve-slide of the cut-off valve. In addition, it is provided that the speed-dependent control pressure is passed, via a line, from the self-holding valve to another pressure chamber of the cut-off valve. Finally, the control valve-slide of the cut-off valve comprises a servo-piston which, when the neutralizing pressure acts on the valve-slide, opens a connection between a pressure chamber of the cut-off valve that can be drained and the pressure chamber of the cut-off valve that is acted upon by the speed-dependent pressure.

Furthermore, in another embodiment it can be provided that the cut-off valve has a pressure chamber in which a restoring spring that acts on the control valve-slide is arranged, that this pressure chamber is connected, via a line, to the pressure medium tank; that a one-way valve, which blocks in the direction toward the cut-off valve, is arranged in the line and that a hydraulic throttle is arranged in a line whose flow bridges across the one-way valve.

This structure with a one-way restrictor makes it possible to prolong the time taken to restore the control valve-slide of the cut-off valve to its spring-loaded starting position and to reduce the time to a minimum during which the neutralizing pressure has to be applied to the cut-off valve. Thus, to de-activate the emergency operation function or the hydraulic emergency actuation of the starting clutch, only a short pressure pulse at the neutralizing pressure input of the cut-off valve is needed.

According to a further embodiment of a control valve arrangement constructed in accordance with the invention, it is provided that the pressure chamber of the self-holding valve, remote from the restoring spring, can be acted upon by a pilot pressure, by way of which the control valve-slide of the self-holding valve, once its self-holding function has been de-activated, can be displaced against the restoring force of the restoring spring of the self-holding valve for enough to allow the speed-dependent pressure to act axially upon a servo-position of the control valve-slide.

Moreover, it is preferably provided that the pressure chamber of the at least one clutch regulation valve, remote from the restoring spring, can be acted upon by another or by the same pilot pressure. With the help of this pilot pressure, after de-activation of the self-holding function of the self-holding valve, a servo-piston of the clutch regulation valve can be displaced against the restoring force of a restoring spring that acts upon this control valve-slide far enough to allow a supply pressure, delivered to the clutch regulation valve as the clutch actuation pressure, to be passed on to at least one clutch actuation device.

According to another embodiment of the control valve arrangement, it can be provided that the neutralizing pressure can be delivered to the pressure chamber of the cut-off valve, remote from the restoring spring, and that a pilot pressure $P\_V2$ can be delivered, via a line, to a central pressure chamber of the cut-off valve and from there, in a manner that can be blocked by the control valve-slide of the cut-off valve, via a line, to the pressure chamber of the self-holding valve on the restoring spring side.

In addition the control valve arrangement of the invention can be constructed such that the already mentioned pilot pressure $P\_VST3$ can be delivered to the pressure chamber and the cut-off valve remote from the restoring spring and the pilot pressure $P\_V2$ can be delivered, via a line, to the control pressure chamber of the cut-off valve and from there, in a manner that can be blocked by the control valve-slide of the cut-off valve, via a line, to the pressure chamber of the self-holding valve on the restoring spring side.

According to a last embodiment of the control valve arrangement of the invention, it is provided that the neutralizing pressure can be delivered, via a line, to the pressure chamber of the self-holding valve on the restoring spring side and, via another line, to a pressure chamber of the actuation valve. The latter pressure chamber is formed in the area of the end face, remote from the restoring spring, of the central servo-piston of a three-piston control valve-slide of the actuation valve; that the actuation pressure can be passed from the associated pressure chamber of the self-holding valve, via a line, to a pressure chamber of the actuation valve; that close to this latter pressure chamber, a further pressure chamber is formed in the actuation valve, which is connected with an actuation pressure line that leads to the pressure chamber of the clutch regulation valve remote from the spring and that, by way of the central servo-piston of the control valve-slide of the actuation valve, a connection between the two pressure chambers of the actuation valve close to one another can be blocked.

Let it be said here that with regard to passing on the actuation pressure to the at least one clutch regulation valve, the control valve arrangement can be designed differently with the same effect. As opposed to the embodiments described above, it can also be provided that the actuation pressure is delivered first to the actuation valve, from there to the self-holding valve, and from the latter to the at least one clutch regulation valve.

Finally, it should be pointed out that the control valve arrangement, according to the invention, can be used to good effect not only for vehicle drivetrains with only one starting clutch, but also advantageously for dual-clutch transmissions. In the case of dual-clutch transmissions, however, it must be ensured that to realize the emergency operation mode described, only one of the two starting clutches need be or remain closed.

BRIEF DESCRIPTION OF THE DRAWINGS

The invention will now be described, by way of example, with reference to the accompanying drawings in which.

DETAILED DESCRIPTION OF THE INVENTION

Figure 1:
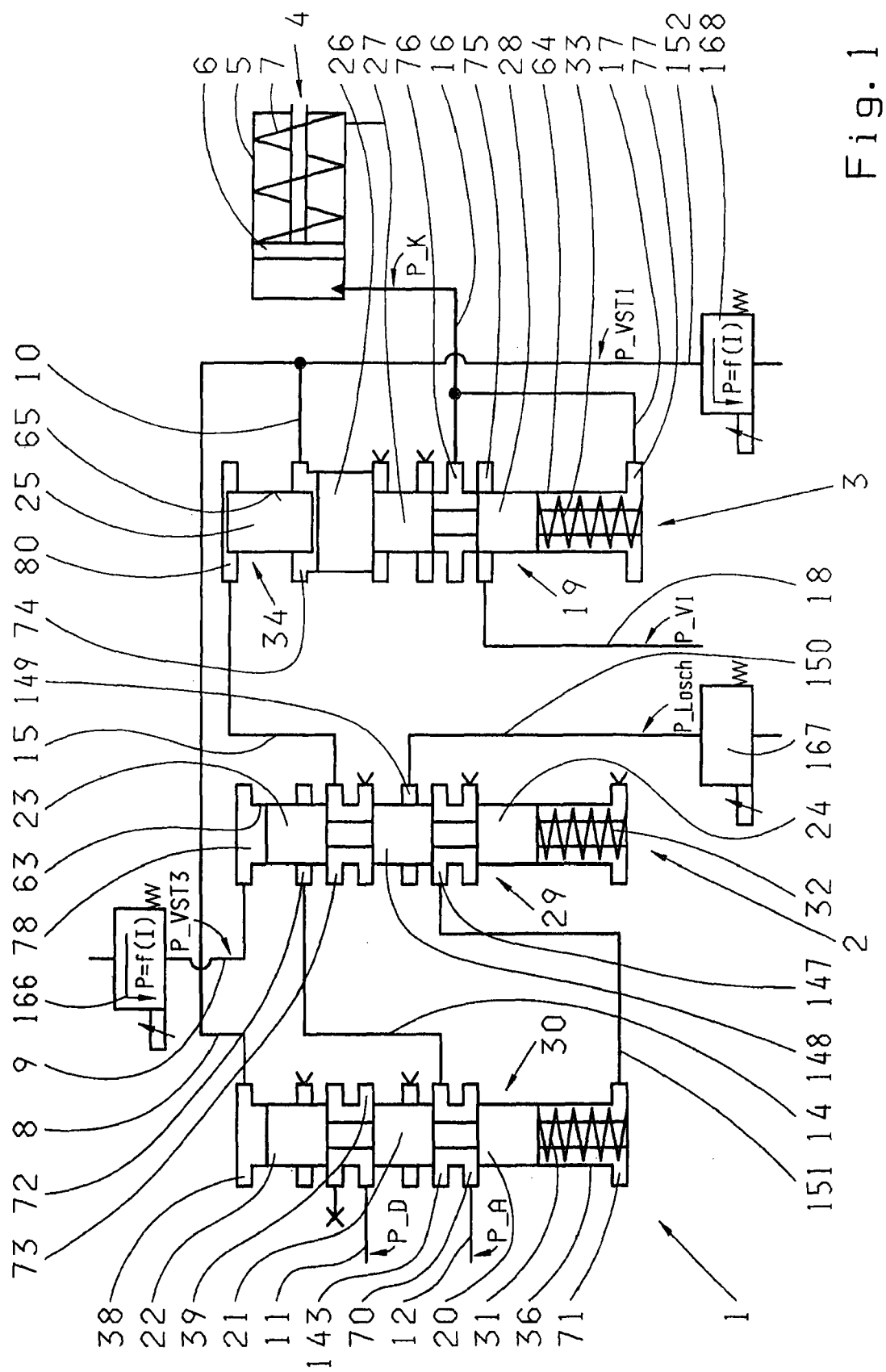
FIG. 1 is a control valve arrangement with a self-holding hydraulic system and means for the de-activation of a self-holding function.

The control valve arrangement, shown in FIG. 1, comprises a self-holding valve 1, an emergency operation actuation valve 2 (called the actuation valve in what follows), a clutch regulation valve 3 and a clutch actuation device 4. The clutch actuation device 4 comprises a cylinder 5 in which a piston 6 is surrounded co-axially in the area of its piston rod by a restoring spring 7 that acts in opposition to a clutch actuation pressure P_K and which, when its end face, remote from the spring is acted upon by pressure, can be moved in a closing direction in such a manner that a starting clutch of an automatic transmission is engaged such that torque is transmitted.

The starting clutch (not shown here), but known to those with knowledge of the field, is part of an automatic transmission which can be made as a variable-speed automatic gearbox based on a planetary transmission, a gearbox that changes its transmission ratio continuously or an automated change-under-load gear shift transmission. When the control valve arrangement is intended for a dual-clutch transmission, two clutch regulation valves and two clutch actuation devices are used.

The valves 1, 2 and 3 are arranged in a valve casing (not shown) of an electro-hydraulic control unit for the transmission, each valve having at least one control valve-slide which can be moved axially by hydraulic pressures and/or restoring spring forces to open, connect and/or close pressure chambers.

The self-holding valve 1 has a control valve-slide 30 arranged to move axially in a valve bore 36. The control valve-slide 30 has three spaced apart servo-pistons 20, 21 and 22. An end face of the servo-piston 20 is acted upon with a restoring force by a restoring spring 31, which is arranged in a pressure space 71 of the self-holding valve 1.

The axially opposite end of the control valve-slide 30 is acted upon, when necessary, by a pilot pressure P_VST1 which can be delivered, via a pressure line 8, to a pressure chamber 38 of the self-holding valve 1. The pilot pressure P_VST1 is also delivered by a line 10 to a pressure chamber 74 of the clutch regulation valve 3, which serves to exert pressure on the free end faces of two control valve-slides 19, 34 of the clutch regulation valve 3, whose function will be described below in due course.

The pilot pressure P_VST1 is provided by a pressure regulation valve 168 from the main pressure of the pressure medium generated by an oil pump (not shown). For this purpose the pressure regulation valve 168 can be controlled by an electronic control unit not shown here, preferably a transmission control unit.

Another pilot pressure P_VST3 is provided from the main pressure by a pressure regulation valve 166, which can also be controlled by the electronic control unit. This pilot pressure P_VST3 is delivered to a pressure chamber 78 of the actuation valve 2 remote from the restoring spring, wherein it can act on the end face of a servo-piston 23 of a control valve-slide 29 of the actuation valve 2.

In addition, via a line 11, a control pressure P_D is delivered to a pressure chamber 39 of the self-holding valve 1, between the servo-pistons 21 and 22. The level of this pressure depends on the speed of the vehicle's drive engine.

Furthermore, via a line 12, an actuation pressure P_A is delivered to a pressure chamber 70 of the self-holding valve 1, located between the servo-pistons 20 and 21 which, during emergency operation of the transmission after a failure of the electronic control unit, ensures that a torque-transmitting clutch of the transmission remains engaged in a speed-dependent manner.

With regard to the structure of the actuation valve 2, it should be mentioned that its control valve-slide 29 has three spaced apart servo-pistons 23, 148 and 24 that are arranged to move axially in a bore 63 of the valve casing. An end face of the servo-piston 24 is acted upon by the force of a restoring spring 32.

The pilot pressure P_VST3 already mentioned can be delivered by a line 9 to a pressure chamber 78 at the axially opposite end of the control valve-slide 29. Also, a line 14 connects the pressure chamber 70 or 143 of the self-holding valve 1 to a pressure chamber 72 of the actuation valve 2, so that this pressure chamber 72 can be closed by way of the servo-piston 23 remote from the restoring spring or, if the pilot pressure P_VST3 is absent, connected hydraulically to a pressure chamber 73 of the actuation valve 2.

By way of the central servo-piston 148, a pressure chamber 149 of the actuation valve 2, connected to a line 150, can be engaged or, when the pilot pressure P_VST3 is absent, connected to a pressure chamber 147 of the actuation valve. In certain critical operating situations of the motor vehicle or its automatic transmission, the line 150 carries a hydraulic neutralizing pressure P_Lösch, which is provided by a switching valve 167 that can be actuated by the electronic control unit. The pressure chamber 147 is connected by a line 151 to the pressure chamber 71 of the already mentioned self-holding valve 1.

The clutch regulation valve 3 comprises an axially longer control valve-slide 19 with three servo-pistons 26, 27 and 28 and the axially shorter control valve-slide 34, which are held and able to move axially in bores 64 and 65 of the valve casing. At one end of the servo-piston 28, the axially longer control valve-slide 19 is acted upon by a restoring force of a restoring spring 33.

The axially shorter control valve-slide 34 comprises a servo-piston 25 whose end facing toward the other control valve-slide 19 can be acted upon by the already mentioned pilot pressure P_VST1. For this, the pressure chamber 74 of the clutch regulation valve 3 is connected, via lines 10 and 152, to a pressure regulation valve 168 that produces the pilot pressure P_VST1. The actuation pressure P_A can be delivered, via a line 15, to the opposite end face of the piston 25 in a pressure chamber 80, which is connected to a pressure chamber 73 of the actuation valve 2.

The axially longer control valve-slide 19 of the clutch regulation valve 3 has three servo-pistons 26, 27 and 28. The two pistons 26 and 27 are arranged axially directly adjacent to one another. The free end of the servo-piston 26, opposite the axially shorter control valve-slide 34, can also be acted upon, via the pressure chamber 74, by the pilot pressure P_VST1, while the end of the servo-piston 28, remote from the restoring spring, is associated with a pressure chamber 75 to which a system or supply pressure P_V1 can be delivered.

During normal operation, this pressure chamber 75 can be connected with an adjacent pressure chamber 76 by actuating the clutch control valve 3 by way of the pilot pressure P_VST1 so that a controlled clutch actuation pressure P_K, produced by the servo-piston 28, can act in the pressure chamber 76. In addition, the pressure chamber 76 is connected by a line 16 to the cylinder 5 of the clutch actuation device 4 and to a pressure chamber 77 of the clutch regulation valve 3 that also accommodates its restoring spring 33.

The mode of operation of the control valve arrangement shown in FIG. 1, is now as follows:

During normal driving operation the pilot pressure P_VST1 is set such that the control valve-slide 30 of the self-holding valve 1 is pushed axially against the force of the spring 31 such that the servo-piston 20 is axially displaced far enough to open a path for the supply pressure P_A from the pressure chamber 70, via a pressure chamber 143 and a line 14, to a pressure chamber 72 of the actuation valve 2.

In addition, during normal driving operation, the pilot pressure P_VST3 acts within the pressure chamber 78 of the actuation valve 2 in such a manner that the latter's control valve-slide 29 is pushed axially within the bore 63 against the force of the restoring spring 32 far enough for the pressure chamber 73 to be separated from the pressure chamber 72 by the servo-piston 23. This prevents the passage of the actuation pressure P_A from the actuation valve 2, via a line 15, to the clutch regulation valve 3.

Furthermore, via line 10, the axially longer control valve-slide 19 of the clutch regulation valve 3 is acted upon by the pilot pressure P_VST1 in such a manner that a control edge of the servo-piston 28 opens up the pressure chamber 75 of the clutch regulation valve 3 to a greater or lesser extent. In this way, as a function of the pilot pressure P_VST1, the supply pressure P_V1 can be adjusted to the clutch actuation pressure P_K such that the clutch actuation device 4 can ultimately be brought to a position that disengages or engages the clutch. Of course, intermediate positions can also be set in which the clutch is operated in a slipping mode.

In FIG. 1, it can also be seen that the end of the servo-piston 28 of the clutch regulation valve 3 facing the restoring spring 33 can also be acted upon by the controlled clutch actuation pressure P_K or by the actuation pressure P_A, via the pressure chamber 76 and lines 16 and 17.

For example, if a fault or failure of the transmission control unit results in an absence, or at least a large decrease of the pilot pressure P_VST1 and P_VST3, the speed-dependent pressure P_D in the pressure chamber 39 of the self-holding valve 1 becomes effective for actuation. If the speed of the vehicle's drive engine is high enough such that stalling of the engine is not to be feared, this control pressure P_D will also be high enough to be able to keep the control valve-slide 30 of the self-holding valve 1 positioned such that the supply pressure P_A is delivered, via the pressure chambers 70 and 143 and via line 14, to the pressure chamber 72 of the actuation valve 2.

The self-holding function of the self-holding valve 1 ceases when the speed-dependent control pressure P_D falls below a predetermined value. This limiting pressure value characterizes the stalling speed of the engine. In such a case, the control valve-slide 30 is pushed axially by the force of the restoring spring 31 in the direction toward the pressure chamber 38 so that the actuation pressure supply P_A of the actuation valve 2 is cut off. The starting clutch is therefore disengaged.

In an emergency operating situation, the pilot pressure P_VST3 is also absent or greatly reduced in the pressure chamber 78 of the actuation valve 2, so that its control valve-slide 29 is pushed axially by the force of the restoring spring 32 in the direction toward the pressure chamber 78 in such a manner that the pressure chambers 72 and 73 are connected to one another. Consequently, the actuation pressure P_A is also delivered, via line 15, to the pressure chamber 80 of the clutch regulation valve 3, where it acts upon the axially shorter control valve-slide 34. As a result, the control valve-slide 34 pushes against the free end of the piston 26 of the axially longer control valve-slide 19, so that the latter is pushed axially against the force of the restoring spring 33. Thereby, despite the absence of the pilot pressure P_VST1, the connection between the pressure chambers 75 and 76 is kept disengaged.

Thanks to this mode of action, even if the pilot pressure P_VST1 or P_VST3 is absent, a clutch actuation pressure P_K can be delivered via a line 18, the pressure chambers 75, 76 and line 16 to the clutch actuation device 4 to hold it in its disengaging position.

If the engine speed falls so much that there is a risk of stalling, then the speed-dependent pressure P_D will also have a correspondingly low value. This ultimately leads to an interruption of the emergency operation of the transmission, since the force of the restoring spring 31 in the self-holding valve 1 will then be sufficient to push its control valve-slide 30 axially far enough to cut off the actuation pressure connection between the pressure chamber 70 of the self-holding valve 1 and the pressure line 14.

As a result of this, the short control valve-slide 34 of the clutch regulation valve 3 will also no longer be acted upon by the actuation pressure P_A so that the longer control valve-slide 19, driven by the force of the restoring spring 33, is moved to a position such that the connection, between the pressure chambers 75 and 76, is cut off. Consequently, the clutch actuation pressure in the cylinder 5 of the clutch actuation device 4 also falls so that its piston 6, driven by the force of the restoring spring 7, is pushed to its disengaged position.

As FIG. 1 makes clear, if the speed-dependent control pressure P_D again increases after an emergency operation phase, the clutch actuation device 4 at first can not be restored to its engaging position, giving the advantage from a standpoint of safety that the engine speed can be run up in a repair workshop for test purposes without the resultant increase of the speed-dependent pressure P_D then automatically establishing a force flow in the automatic transmission.

With the control valve arrangement described, according to the invention, a further operating mode is possible in which, in certain critical operating situations of the motor vehicle or the automatic transmission, triggering of the emergency operation function described, i.e., when the starting clutch is engaged or kept disengaged in an engine-speed-dependent manner in the event of the electronic control unit failure, is prevented.

For example, an operating situation of a motor vehicle is possible, in which it has first been moving in a forward or a reverse gear with an engine speed above the limiting speed value. During such operation, the self-holding valve 1 of the control valve arrangement has, as described, been activated by the speed-dependent pressure P_D and the control valve-slide 30 has, therefore, been pushed against the force of the restoring spring 31, far enough for pressure medium at the pressure P_D to reach the pressure chamber 39 of the self-holding valve 1.

Starting from such driving operation, when the vehicle is stopped, but the engine speed remains above the limiting speed value, the self-holding valve 1 remains in the position described which enables emergency operation with the starting clutch to be engaged in the absence of the pilot pressure P_VST1, P_VST3. This system behavior persists even when the starting clutch is disengaged by actuation of the selector lever to the transmission selector positions neutral or parking P.

Now prevent the possibility that in such a situation with a gear engaged, the starting clutch disengaged, the transmission selector lever at neutral or parking P and an engine speed above the limiting value, the starting clutch is then automatically engaged by virtue of a failure of the electronic control unit and thus an absence of the pilot pressure P_VST1, P_VST3, such autonomous engaging of the starting clutch can be prevented by the prompt application of the neutralizing pressure.

To do this, the electro-hydraulic valve 167, shown in FIG. 1, is actuated so that a hydraulic neutralizing pressure P_Lösch is present in line 150, leading to the pressure chamber 149 of the actuation valve 2. Inasmuch as the pilot pressure P_VST3 is present in line 9, this acts via the pressure chamber 78 of the actuation valve 2 on the free end of the servo-piston 23 of the control valve-slide 29 in the actuation valve 2 so that the control valve-slide 29 is pushed against the force of the restoring spring 32. Thereby, when the electronic control unit is functional the pressure chamber 149 is closed by the servo-piston 148 and the connection, between the pressure chambers 72 and 73, is cut off.

Now, if the pilot pressures P_VST1 and P_VST3 cease to act, then as already explained, and if the speed-dependent pressure P_D were high enough, the control valve-slide 30 of the self-holding valve 1 would remain in its position, shown in FIG. 1, while the control valve-slide 29 of the actuation valve 2, driven by the restoring spring 32, would be moved in the direction toward the pressure chamber 78 so that the pressure chambers 73 and 74 would be connected. This would enable the actuation pressure P_A to reach the clutch regulation valve 3 and there push the smaller control valve-slide 34 in such a manner that, by virtue of the large control valve-slide 19, pressure medium at the supply pressure P_V1 could be delivered to the clutch actuation device 4 for engaging the starting clutch.

However, thanks to the delivery of the neutralizing pressure P_Lösch to the actuation valve 2, according to the invention, if the pilot pressure P_VST3 is absent then pressure medium at the neutralizing pressure P_Lösch passes from the pressure chamber 149 into the pressure chamber 147 and from there, via line 151, to the pressure chamber 71 at the foot of the self-holding valve 1. Here, the neutralizing pressure P_Lösch pushes from below and assists the restoring spring 31 in biasing the servo-piston 20 so that the control valve-slide 30 moves against the speed-dependent pressure P_D in the direction toward the pressure chamber 38. This blocks the delivery of actuation pressure P_A to the pressure chamber 70 byway of the servo-piston 20, with the consequence that the actuation valve 2 and the clutch regulation valve 3 are not supplied with this actuation pressure P_A and the starting clutch is disengaged or remains disengaged due to the force of the restoring spring 7 in the clutch actuation device 4.

The neutralizing pressure P_Lösch is delivered by actuation of the electro-hydraulic valve 167 when the electronic control unit is functioning and the critical operating situation of the vehicle occurs (described above). If the electronic control unit then fails, the emergency operation function of the hydraulic control arrangement could not be activated. When the critical operating situation is no longer present and the electronic control unit is still working correctly, the latter switches off the neutralizing pressure P_Lösch by de-energizing the valve 167 so that the control valve-slide 30 of the self-holding valve 1, under the action of the pilot pressure P_VST1 applied there, is displaced against the force of the restoring spring 31 for the speed-dependent pressure P_D to fill the pressure chamber 39 at the end of the servo-piston 21 remote from the restoring spring.

Although the control valve arrangement according to FIG. 1 as such, has a very advantageous structure, in order to initiate its neutralizing function, i.e., to prevent activation of the emergency operation function, the hydraulic emergency operating function has to be activated by briefly cutting off the pilot pressure P_VST3. Because of this a perceptible though short engaging of the starting clutch cannot be completely excluded. The following embodiments of the control valve arrangement, according to the invention, avoid the possible occurrence of this disadvantage.

Figure 2:
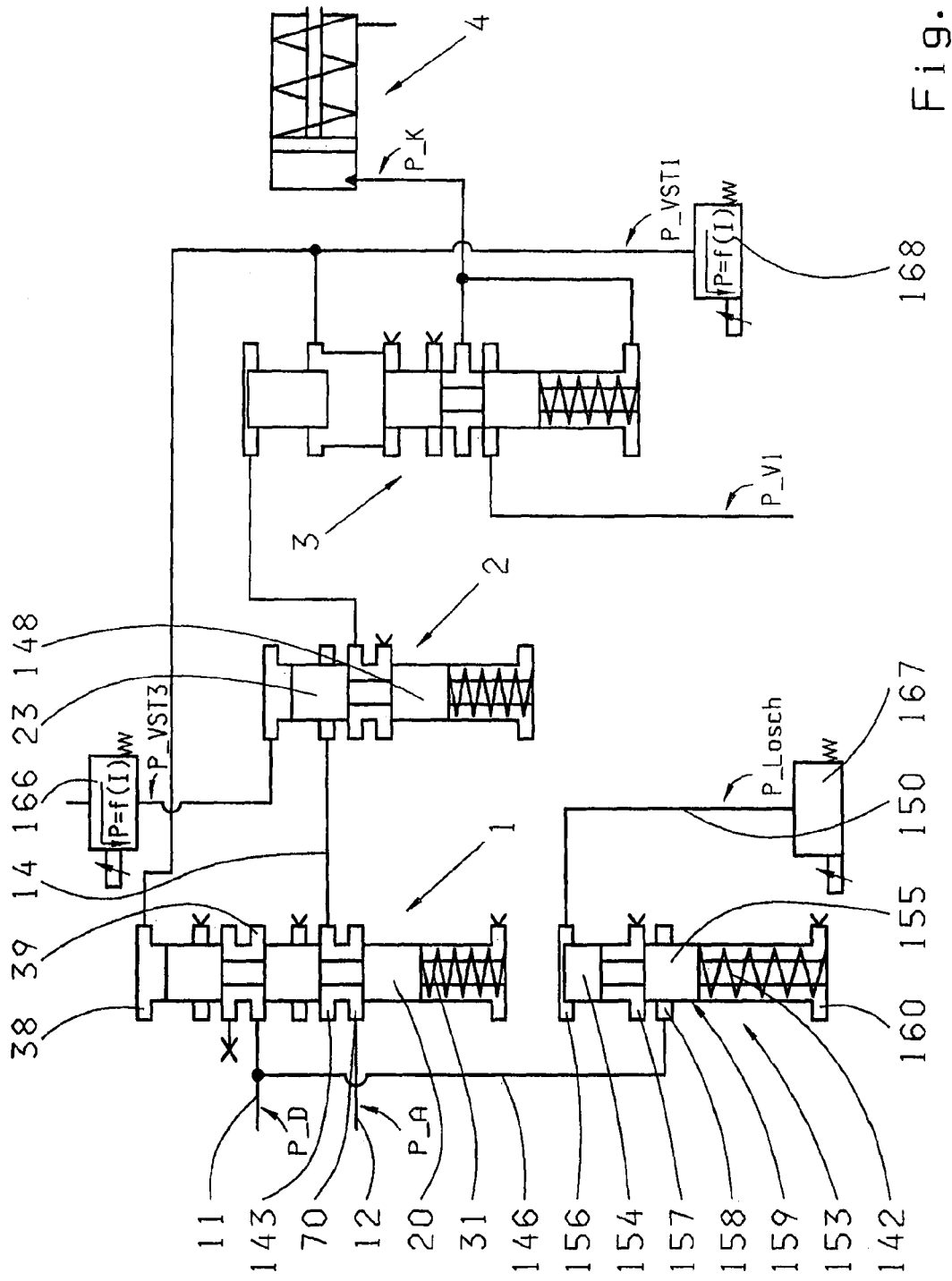
FIG. 2 is a control valve arrangement as in FIG. 1, but with a cut-off valve for de-activating the self-holding function.

The control valve arrangement, according to the invention shown in FIG. 2, differs from the example embodiment just explained mainly in that it comprises a separate cut-off valve 153, while the actuation valve 2 has only two servo-pistons 23 and 148. The cut-off valve 153 has a control valve-slide 159 with two servo-pistons 154 and 155 a distance apart, which can be pushed to its starting position by the restoring spring 166 a pressure chamber 156 is formed. At the end of the cut-off valve 153, remote from the restoring spring, can be pressurized, via line 150, with the neutralizing pressure P_Lösch. Between the two servo-pistons 154, 155 is formed a pressure chamber 157 that can be drained into a pressure medium tank. This pressure chamber 157 can be connected by axial displacement of the servo-piston 155 against the force of a restoring spring 142 to a pressure chamber 158, which is connected via a line 146 to line 11 that carries the engine-speed-dependent control pressure P_D in the area of the pressure chamber 39 of the self-holding valve 1.

To suppress the emergency operation function of the control valve arrangement, according to FIG. 2, in the critical vehicle operation situation outlined above, the pressure chamber 156 of the cut-off valve 153 is pressurized with the neutralizing pressure P_Lösch so that its control valve-slide 159 is moved against the force of the restoring spring 142. This causes the servo-piston 155, with its control edge, to open the pressure chamber 158 so that pressure medium at the speed-dependent pressure P_D passes from line 11 or the pressure chamber 39 of the self-holding valve 1, via a line 146, and the pressure chamber 158 into the pressure chamber 157. From there, the pressure medium passes into a pressure medium tank 165 so the pressure in the pressure chamber 39 of the self-holding valve 1 falls until its control valve-slide 30 is moved by the force of the restoring spring 31. The servo-piston 20 of the control valve-slide 30 then cuts off the pressure chamber 70 from the pressure chamber 143 so that the actuation pressure P_A can no longer pass from the self-holding valve 1 to the actuation valve 2. Thus, the self-holding function for emergency operation of the drivetrain, if an electronic control unit failure occurs, cannot at first be activated.

As soon as the critical vehicle operation situation outlined has disappeared, the neutralizing pressure P_Lösch is received by the pressure chamber 156 of the cut-off valve 153 so that the drainable pressure chamber 157 is no longer acted upon by pressure medium at the pressure P_D which, instead, again passes into the pressure chamber 39 of the self-holding valve 1. Since the pilot pressure P_VST1 is acting in the pressure chamber 38 of the self-holding valve 1, the control valve-slide 30 of the self-holding valve 1 is again pushed against the force of the restoring spring 31 so that, even if the pilot pressure P_VST1 should subsequently disappear, pressure medium at the pressure P_A can still pass from the self-holding valve 1 to the actuation valve 2 when the speed-dependent pressure P_D is high enough.

In the two embodiments of the control valve arrangement described so far, it is necessarily the case that the discharge of the pressure medium at the speed-dependent pressure P_D into a pressure medium tank 165 and the return of the control valve-slide 30 of the self-holding valve 1 to its starting position take up a certain time. Furthermore, during this the neutralizing pressure P_Lösch must be applied continually. To design this working behavior in a different way, the control valve arrangement, according to FIG. 3, is equipped with a one-way restrictor ball in the cut-off valve, which prolongs the restoration duration of the return of the control valve-slide 30 of the self-holding valve 1 and shortens the time during which the neutralizing pressure P_Lösch must be applied to the cut-off valve 153 to the point where, to de-activate the emergency operation property of the control valve arrangement, only a short pressure pulse P_Lösch is needed.

Figure 3:
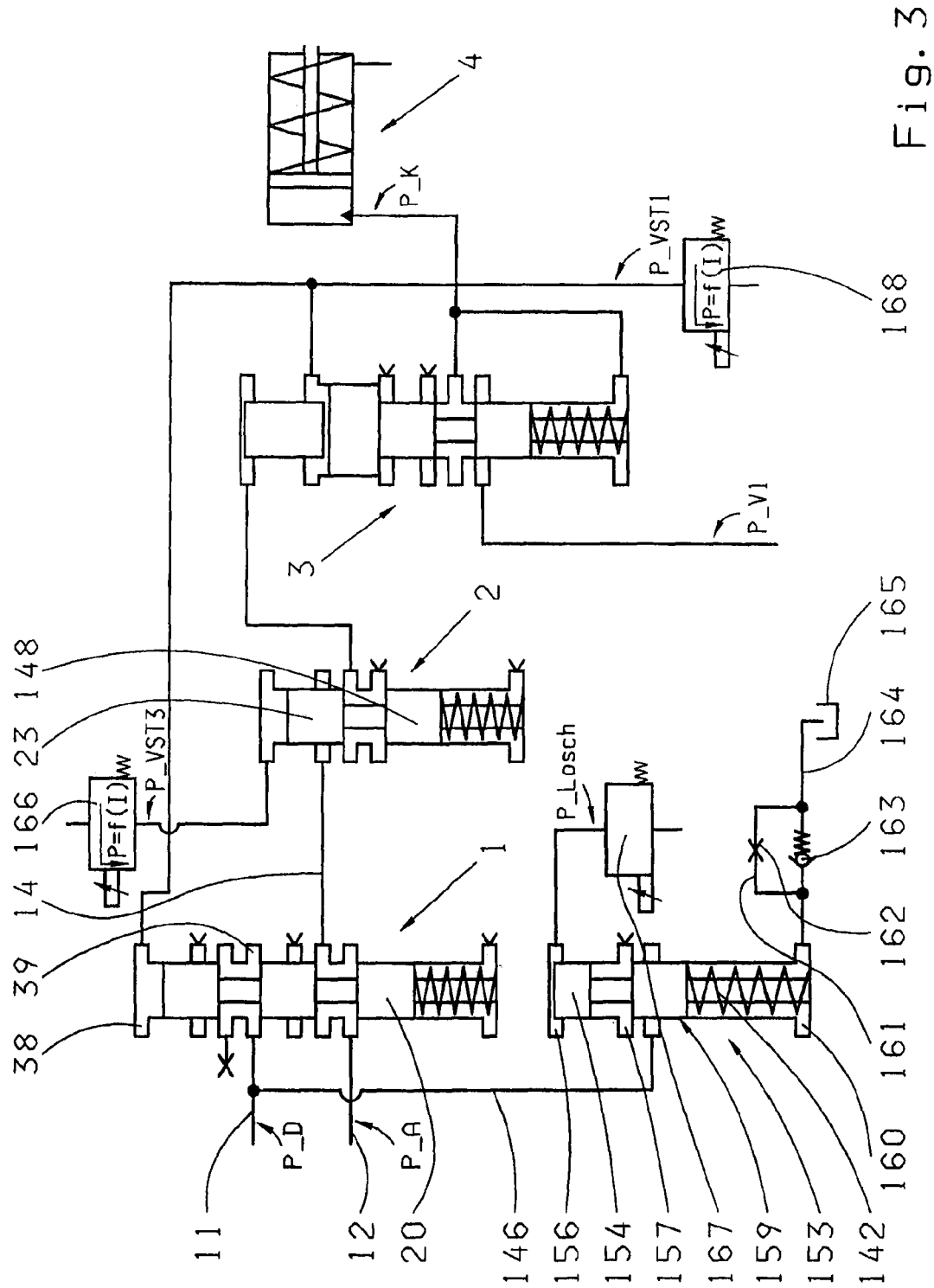
FIG. 3 is a control valve arrangement as in FIG. 2, but with a ball-type one-way restrictor on the cut-off valve.

As can be seen in FIG. 3, the control valve arrangement is largely identical to that of FIG. 2. As a supplement thereto, a pressure chamber 160 in which the restoring spring 142 of the cut-off valve 153 is located, is connected to a line 164 which disengages into the pressure medium tank 165. Integrated in this line is a spring-loaded one-way ball valve 163 which blocks in the direction toward the cut-off valve 153, which can be bridged across by a line 161 that has a hydraulic throttle 162.

With regard to its structure and mode of operation, the embodiment of the control valve arrangement, according to FIG. 4, corresponds largely to the embodiment shown in FIG. 2, so that in what follows essentially only the differences will be explained. Whereas the neutralizing pressure P_Lösch can be delivered by line 150 to the pressure chamber 156 of the cut-off valve 153, its pressure chamber 158 can be acted upon, via a line 81, by a control pressure P_V2. For example, the two pressures P_Lösch and P_V2 can be the main pressure of the hydraulic system produced by the pressure medium pump or a reduced pressure of the hydraulic system, which can preferably be switched on by way of electromagnetically actuated valves 90 or 167 respectively. In addition, a line 82 runs from the pressure chamber 158 of the cut-off valve 153 to the pressure chamber 71 of the self-holding valve 1.

During normal operation of the vehicle, the restoring spring 142 pushes the control valve-slide 159 of the cut-off valve 153 to its home position, so that the pressure chamber 158 is closed by the servo-piston 155. In the critical operating situation already mentioned, the pilot pressure P_VST1 is no longer applied at the level required in the pressure chamber 38 of the self-holding valve 1, but the speed-dependent pressure P_D is high enough to move the servo-piston 21 of the self-holding valve 1 against the force of the restoring spring 31 far enough for pressure medium at the actuation pressure P_A to be delivered to the clutch regulation valve 3 in order to realize an emergency operation function.

Now, to prevent the activation of the hydraulic emergency operation, the neutralizing pressure P_Lösch is delivered to the pressure chamber 156. This moves the control valve-slide 159 against the force of the restoring spring 142 so that pressure medium at the pilot pressure P_V2 passes into the pressure chamber 71 of the self-holding valve 1 on the spring side, via line 81, the pressure chamber 158 and line 82. The pilot pressure P_V2, supported by the force of the restoring spring 31, then pushes the control valve-slide 30 to its home position so that, although the speed-dependent control pressure P_D is high enough for emergency operation, no actuation pressure can get from the self-holding valve 1 to the actuation valve 2.

Figure 4:
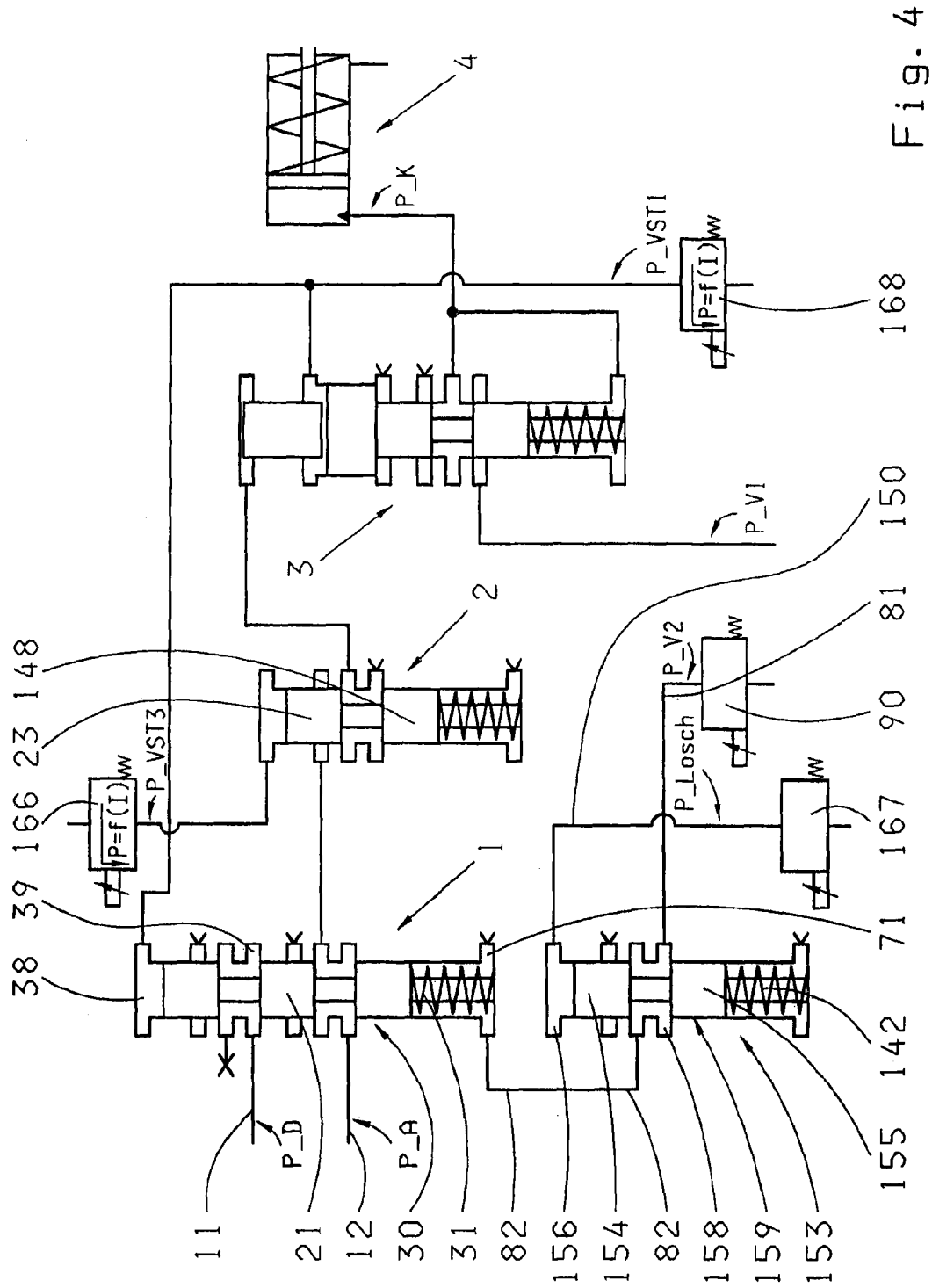
FIG. 4 is another embodiment of the control valve arrangement, similar to that shown in FIG. 2.
Figure 5:
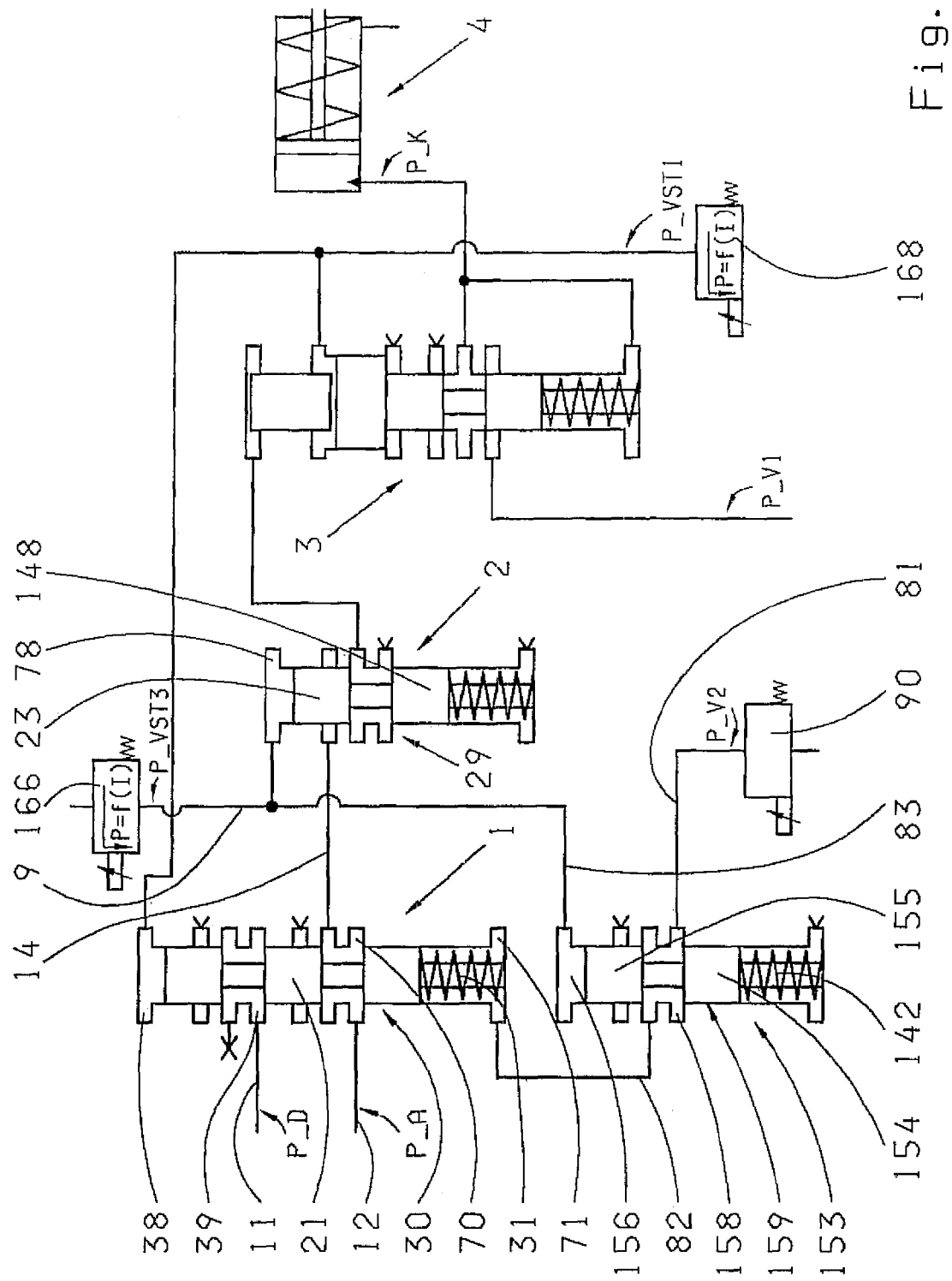
FIG. 5 is another control valve arrangement, similar to that of FIG. 4.
Figure 6:
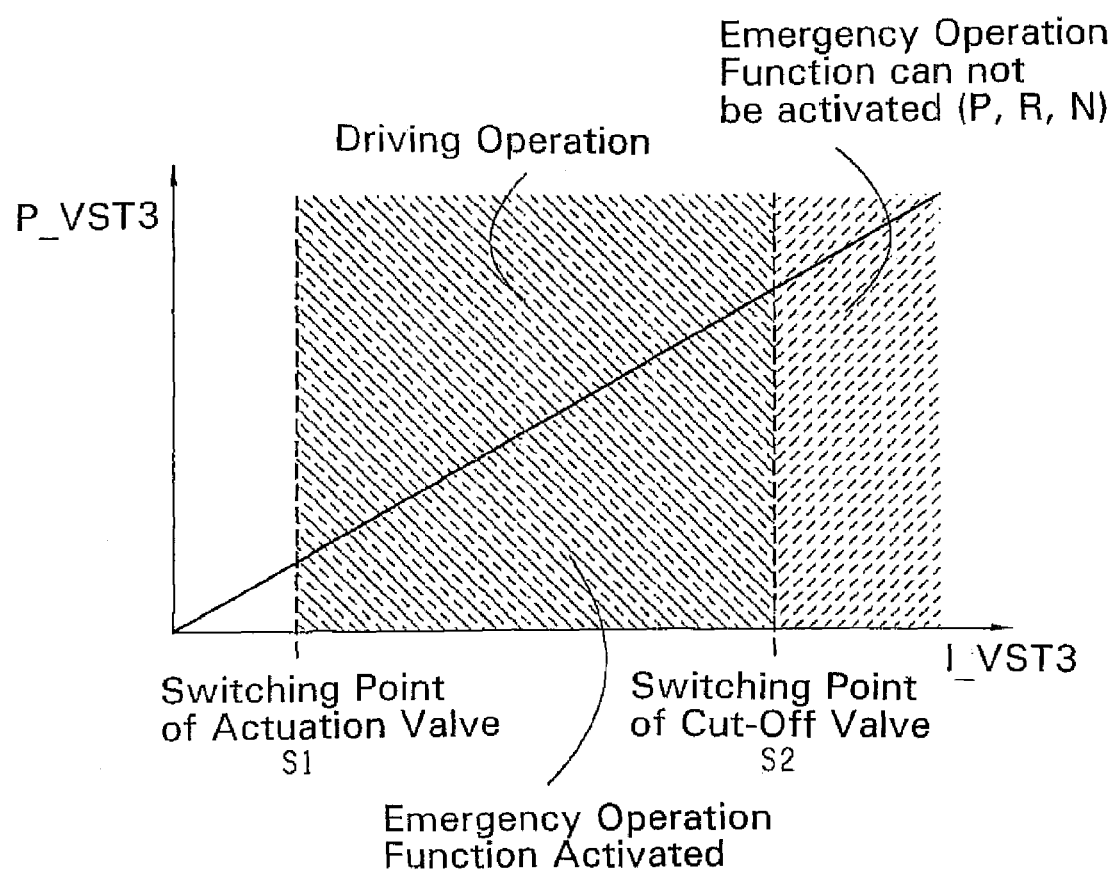
FIG. 6 is a diagram of various operating functions of the control valve arrangement shown in FIG. 5.

A further embodiment, similar to the control valve arrangement according to FIG. 4, is shown in FIG. 5. Advantageously, in this case the delivery of the separate neutralizing pressure P_Lösch is dispensed with. Rather, the pilot pressure P_VST3 is not only passed to the actuation valve 2, via line 9, but also via a line 83, to the pressure chamber 156 of the cut-off valve 153. By a different switching point design of the cut-off valve 153 and the actuation valve 2, this pilot pressure P_VSR3 can be used to actuate both valves 2, 153, as will be explained below with reference to FIGS. 5 and 6.

During normal operation of the vehicle, the pilot pressure P_VST3 acts both in the pressure chamber 78 of the actuation valve 2 and in the pressure chamber 156 of the cut-off valve 153. Accordingly, the servo-piston 23 of the actuation valve 2 blocks the delivery of the actuation pressure P_A to the clutch regulation valve 3, so that the emergency operation function is de-activated. By designing the switching points of the actuation valve 2 and the cut-off valve 153 differently, in normal operation the pilot pressure P_VST3 can be set between the two switching points S1 and S2 in FIG. 6 so that the piston 155 of the cut-off valve 153 remains in its home position, the pressure chamber 71 of the self-holding valve 1 on the spring side is drained into the pressure medium tank, and when the pilot pressure P_VST1 in the pressure chamber 38 and/or the speed-dependent pressure P_D in the pressure chamber 39 is high enough, the valve piston 21 of the self-holding valve 1 is held in its pushed-over position against the force of the restoring spring and the emergency operation function can therefore be activated. The emergency operation function is de-activated by increasing the pilot pressure P_VST3 above the switching threshold S2 in FIG. 6, where the valve piston 155 of the cut-off valve 153 is pushed away from its rest position against the restoring spring force and the pilot pressure P_V2 in the pressure chamber 158 is passed via pressure line 82 into the pressure chamber 71 of the self-holding valve 1 on the spring side so that the valve piston 21 of the self-holding valve 1 is pushed back with spring support to its home position against the pilot pressure P_VST1 that may be present in the pressure chamber 38 and the speed-dependent pressure P_D that may be present in the pressure chamber 39 so that the connection, between the actuation pressure P_A in the pressure chamber 70 and pressure line 14 leading to the actuation valve 2, is interrupted.

Figure 7:
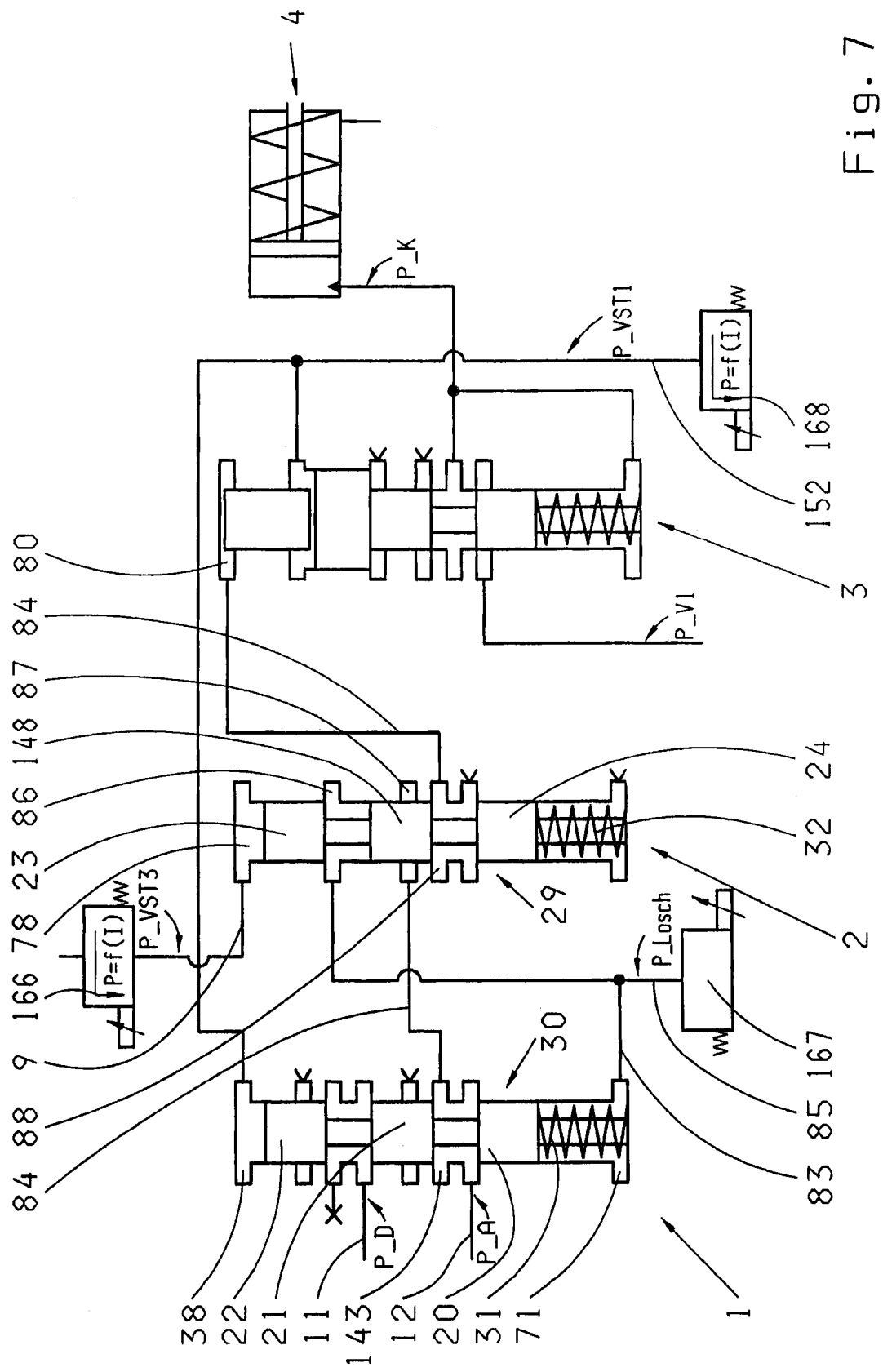
FIG. 7 is a last embodiment of the control valve arrangement according to the invention.

Finally, FIG. 7 shows a control valve arrangement, according to the invention, in which described activation of the emergency operation function can be prevented by pushing the self-holding valve 1 on the spring chamber side to its home position by the action of the neutralizing pressure P_Lösch and, at the same time, bringing the actuation valve 2, against the force of its restoring spring, to a position in which a servo-piston of the actuation valve 2 prevents the further transmission of the actuation pressure P_A.

For this, according to FIG. 7 a control valve arrangement is provided, which is largely the same as that shown in FIG. 1, since the actuation valve 2 is made with three servo-pistons 23, 24 and 148. In addition, the neutralizing pressure P_Lösch can be delivered, via a line 83, to the pressure chamber 71 of the self-holding valve 1 on the restoring spring side and to a pressure chamber 86 of the actuation valve 2, via a line 85, which is arranged axially between the two servo-pistons 23 and 148 remote from the restoring spring. The actuation pressure P_A can be delivered by the self-holding valve 1, via a line 84, to a pressure chamber 87 which can be blocked off by the servo-piston 148 of the actuation valve 2. Between the servo-pistons 148 and 24, a pressure chamber 88 in the actuation valve 2 is formed, which can be connected to the pressure chamber 87 when the control valve-slide 29 is appropriately positioned and thus enables the actuation pressure P_A to be passed on via a line 84 to the pressure chamber 80 of the clutch regulation valve 3.

With this control valve arrangement according to FIG. 7, in order to prevent activation of the emergency operation function, if the pilot pressure P_VST3 disappears, the neutralizing pressure P_Lösch is passed both to the pressure chamber 71 of the self-holding valve 1 on the spring side and also to the pressure chamber 86 of the actuation valve 2. Thereby, the control valve-slide 30 of the self-holding valve 1 is pushed to its non-spring-loaded home position against a possibly sufficiently high speed-dependent control pressure P_D. In addition, this neutralizing pressure P_Lösch in the pressure chamber 86 of the actuation valve 2 pushes its control valve-slide 29 against the force of the restoring spring 32 far enough for the middle servo-piston 148 to prevent the further transmission of the actuation pressure P_A via the pressure chambers 87 and 88.

REFERENCE NUMERALS

1 self-holding valve
2 actuation valve
3 clutch regulation valve 4 clutch actuation device
5 cylinder
6 clutch piston
7 restoring spring
8 line carrying the pilot pressure P_VST1
9 line carrying the pilot pressure P_VST3
10 line carrying the pilot pressure P_VST1
11 line carrying the speed-dependent pressure P_D
12 line carrying the actuation pressure P_A to the self-holding valve
14 connection line self-holding valve to actuation valve
15 connection line actuation valve to clutch regulation valve
16 connection line clutch regulation valve to clutch actuation device
17 connection line clutch regulation valve to clutch actuation device
19 line carrying the supply pressure
19 control valve-slide in the clutch regulation valve
20 servo-piston on the control valve-slide in the self-holding valve
21 servo-piston on the control valve-slide in the self-holding valve
22 servo piston on the control valve-slide in the self-holding valve
23 servo-piston on the control valve-slide in the actuation valve
24 servo-piston on the control valve-slide in the actuation valve
25 servo-piston on the control valve-slide in the clutch regulation valve
26 servo-piston on the control valve-slide in the clutch regulation valve
27 servo-piston on the control valve-slide in the clutch regulation valve
28 servo-piston on the control valve-slide in the clutch regulation valve
29 control valve-slide in the actuation valve
30 control valve-slide in the self-holding valve
31 restoring spring in the self-holding valve
32 restoring spring in the actuation valve
33 restoring spring in the clutch regulation valve
34 short control valve-slide in the clutch regulation valve
36 valve bore in the self-holding valve
38 pressure chamber in the self-holding valve
39 pressure chamber in the self-holding valve
63 bore for the control valve-slide in the actuation valve
64 bore for the long control valve-slide in the clutch regulation valve
65 bore for the short control valve-slide in the clutch regulation valve
70 pressure chamber in the self-holding valve
71 pressure chamber in the self-holding valve
72 pressure chamber in the actuation valve
73 pressure chamber in the actuation valve
74 pressure chamber in the clutch regulation valve
75 pressure chamber in the clutch regulation valve
76 pressure chamber in the clutch regulation valve
77 pressure chamber in the clutch regulation valve
78 pressure chamber in the actuation valve
80 pressure chamber in the clutch regulation valve
81 line
82 line
83 line
84 line
85 line
86 pressure chamber
87 pressure chamber
88 pressure chamber
90 electromagnetically actuated valve
142 restoring spring of the cut-off valve
143 pressure chamber in the self-holding valve
146 line
147 drainable pressure chamber in the self-holding valve
148 servo-piston in the self-holding valve
149 pressure chamber carrying the neutralizing pressure
150 line carrying the neutralizing pressure
151 line
152 line carrying P_VST1
153 cut-off valve
154 servo-piston
155 servo-piston
156 pressure chamber
157 pressure chamber that can be drained
158 pressure chamber
159 control valve-slide of the actuation valve
160 pressure chamber of the actuation valve
161 line
162 throttle
163 one-way valve
164 line
165 pressure medium tank
166 electromagnetically actuated valve
167 electromagnetically actuated valve
168 electromagnetically actuated valve
I_VST3 control current for valve 166
P_A actuation pressure
P_D speed-dependent control pressure
P_K clutch actuation pressure
P_Lösch neutralizing pressure
P_V1 supply pressure
P_V2 pilot pressure
P_VST1 pilot pressure
P_VST3 pilot pressure
S1 switching point of actuation valve
S2 switching point of cut-off valve

The invention claimed is:

1. A control valve arrangement for controlling actuation of at least one starting clutch of an automatic transmission of a motor vehicle, the control valve arrangement comprising:
a clutch regulation valve (3) for directing a supply pressure (P_V1) to a pressure chamber of a clutch actuation device (4) of the at least one starting clutch;
a pressure regulation valve (166) being controlled by an electronic control unit to produce and direct a controllable pilot pressure (P_VST3) to at least one control valve;
a self-holding hydraulic system which, upon initiation of an emergency operation function caused by a failure of the electronic control system and a consequential loss of the pilot pressure (P_VST3), maintains the clutch actuation device (4) of the at least one starting clutch in a switching condition that existed before the failure of the electronic control system and the consequential loss of the pilot pressure (P_VST3), in at least one operating situation, to operate the self-holding hydraulic system in the emergency operation function, the self-holding hydraulic system comprises a self-holding valve (1) and an actuation valve (2), the self-holding valve (1) directs an actuation pressure (P_A) to the actuation valve (2) depending on an engine-speed-dependent control pressure (P_D), the actuation valve (2) then directs the actuation pressure (P_A) to the at least one clutch regulation valve (3);

a means for preventing, in at least one of the at least one operating situation, the emergency operation function despite loss of the pilot pressure (P_VST3) and a presence of an engine-speed-dependent control pressure (P_D) which is sufficiently high enough to initiate the emergency operation function; and the at least one operating situation is a particular operating situation in which the motor vehicle has first been driven in one of a forward drive gear and a reverse drive gear via the at least one starting clutch which is at least partially engaged, the motor vehicle has then been stopped and then while one of the forward drive gear and the reverse drive gear was engaged in the automatic transmission, the at least one starting clutch has been disengaged by biasing a transmission selector lever into one of a neutral position and a parking position (P).

2. The control valve arrangement according to claim 1, wherein a pressure chamber (38) of the self-holding valve (1) is acted upon by a pilot pressure (P_VST1), after a self-holding function of the self-holding valve (1) is de-activated, to displace a control valve-slide (30) against a force of a restoring spring (31) to enable the speed-dependent control pressure (P_D) to axially act upon a servo-piston (21) of the control valve-slide (30).

3. The control valve arrangement according to claim 1, wherein a pressure chamber (74) of the at least one clutch regulation valve (3) remote from a restoring spring (33) is acted upon by the pilot pressure (P_VST1) to displace a control valve-slide (19), after de-activation of a self-holding function of the self-holding valve (1), against a force of the restoring spring (33) acting on the control valve-slide (19) far enough to enable a supply pressure (P_V1), delivered to the clutch regulation valve (3,) to be passed as a clutch actuation pressure (P_K) to the at least one clutch actuation device (4).

4. The control valve arrangement according to claim 1, wherein a neutralizing pressure (P_Lösch) is delivered to a first pressure chamber (156) of a cut-off valve (153) remote from a restoring spring (142), and a pilot pressure (P_V2) is passed, via a first line (81), to a second pressure chamber (158) of the cut-off valve (153) and the pilot pressure (P_V2) is preventably blocked by a control valve-slide (159) of the cut-off valve (153) from passing, via a second line (82) to a pressure chamber (71), located on a restoring spring side of the self-holding valve (1).

5. The control valve arrangement according to claim 1, wherein the pilot pressure (P_VST3) is delivered to a first pressure chamber (156) of a cut-off valve (153) remote from a restoring spring (142), and another pilot pressure (P_V2) is delivered, via a first line (81), to a second pressure chamber (158) of the cut-off valve (153) and the pilot pressure (P_V2) is blocked by a control valve-slide (159) of the cut-off valve (153) from passing, via a second line (82) to a pressure chamber (71), located on a restoring spring side of the self-holding valve (1).

6. The control valve arrangement according to claim 1, wherein a neutralizing pressure (P_Lösch) is delivered, via a first line (83), to a first pressure chamber (71) located on a restoring spring side of the self-holding valve (1) and, via a second line (85), to a first pressure chamber (86) located remote from a restoring spring (32) of the actuation valve (2) and a middle servo-piston (148) of a three-piston control valve-slide (29) of the actuation valve (2), the actuation pressure (P_A) is passed from a second pressure chamber (143) of the self-holding valve (1), via a third line (84), to a second pressure chamber (87) of the actuation valve (2), a third pressure chamber (88) is located in the actuation valve (2) adjacent to the second pressure chamber (87), the third pressure chamber (88) of the actuation valve (2) is connected, via an actuation pressure line (84), to a pressure chamber (80) of the clutch regulation valve (3), and a connection between the second pressure chamber (87) of the actuation valve (2) and the third pressure chamber (88) of the actuation valve (2) is blocked by the middle servo-piston (148) of the control valve-slide (29) of the actuation valve (2).

7. The control valve arrangement according to claim 1, wherein the actuation pressure (P_A) is first passes, via the self-holding valve (1), to the actuation valve (2) and then to the at least one clutch regulation valve (3).

8. The control valve arrangement according to claim 1, wherein a connection passing the actuation pressure (P_A) between the self-holding valve (1) and the actuation valve (2) is closed to prevent initiation of the emergency operation function when the particular operating situation exists.

9. The control valve arrangement according to claim 8, wherein a neutralizing pressure (P_Lösch) acts upon the actuation valve (2) such that, upon loss of the pilot pressure (P_VST3), the neutralizing pressure (P_Lösch) passes from the actuation valve (2) to the self-holding valve (1) such that the self-holding valve (1) interrupts the passage of the actuation pressure (P_A) to the actuation valve (2).

10. The control valve arrangement according to claim 9, wherein the neutralizing pressure (P_Lösch) delivers to a pressure chamber (71) of the self-holding valve (1) which is delimited by an axially movable servo-piston (20), to interrupt the passage of the actuation pressure (P_A) between the self-holding valve (1) and the actuation valve (2).

11. The control valve arrangement according to claim 10, wherein a restoring spring (31), which acts upon the servo-piston (20), is located within the pressure chamber (71).

12. The control valve arrangement according to claim 1, wherein a cut-off valve (153) drains a pressure medium under the speed-dependent control pressure (P_D) into a pressure medium tank (165) when the neutralizing pressure (P_Lösch) acts on the cut-off valve (153).

13. The control valve arrangement according to claim 12, wherein the neutralizing pressure (P_Lösch) passes to a pressure chamber (156) of the cut-off valve (153), remote from a restoring spring, and acts upon a servo-piston (154) of a control valve-slide (159) of the cut-off valve (153), the speed-dependent control pressure (P_D) is delivered, via a first line (146), from the self-holding valve (1) to a pressure chamber (158) of the cut-off valve (153), and the control valve-slide (159) has a servo-piston (155) which, when the neutralizing pressure (P_Lösch) acts on the control valve-slide (159), opens a connection between a drainable pressure chamber (157) of the cut-off valve (153) and the pressure chamber (158) of the cut-off valve (153) that is pressurized with the speed-dependent control pressure (P_D).

14. The control valve arrangement according to claim 13, wherein the cut-off valve (153) has a pressure chamber (160) which contains a restoring spring (142) that acts upon the control valve-slide (159), the pressure chamber (160) is connected by a second line (164) to a pressure medium tank (165), a one-way valve (163) is located in the second line (164) to prevent passage of pressure toward the cut-off valve (153), and a throttle (162) is arranged in a third line (161) to enable the pressure to bypass the one-way valve (163).

* * * * *